(12) United States Patent
Ginzburg et al.

(10) Patent No.: US 7,602,755 B2
(45) Date of Patent: Oct. 13, 2009

(54) METHOD AND APPARATUS OF SCANNING CONTROL SIGNAL

(75) Inventors: Boris Ginzburg, Haifa (IL); Rony Ross, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 385 days.

(21) Appl. No.: 10/989,409

(22) Filed: Nov. 17, 2004

(65) Prior Publication Data

US 2006/0105791 A1    May 18, 2006

(51) Int. Cl.
*H04W 4/00* (2009.01)
*H04B 7/00* (2006.01)

(52) U.S. Cl. .................. 370/338; 370/328; 370/329; 455/434; 455/515

(58) Field of Classification Search .................. 455/434, 455/435.1, 435.2, 67.11, 151.2, 161.1, 167.1, 455/179.1, 515; 370/328, 329, 330, 336, 370/337, 335, 342, 441, 442, 338
See application file for complete search history.

(56) References Cited

U.S. PATENT DOCUMENTS

| | | | |
|---|---|---|---|
| 5,548,818 A * | 8/1996 | Sawyer et al. ............... 455/515 |
| 6,922,173 B2 * | 7/2005 | Anderson ................... 343/701 |
| 2002/0085516 A1 * | 7/2002 | Bridgelall .................... 370/329 |
| 2005/0068928 A1 * | 3/2005 | Smith et al. .................. 370/338 |
| 2005/0171720 A1 * | 8/2005 | Olson et al. .................. 702/121 |
| 2005/0255877 A1 * | 11/2005 | Fuccello et al. .......... 455/552.1 |
| 2006/0057964 A1 * | 3/2006 | Roy et al. ................. 455/67.11 |

* cited by examiner

*Primary Examiner*—Nay A Maung
*Assistant Examiner*—Andrew Wendell
(74) *Attorney, Agent, or Firm*—Shiloh Buchek PLLC

(57) ABSTRACT

Briefly, a method and apparatus to perform a passive scanning by partitioning a control signal scanning period into two or more portions. A distance from one portion of scanning period to another portion of scanning period is substantially equal to a control signal transmission interval.

35 Claims, 1 Drawing Sheet

METHOD AND APPARATUS OF SCANNING CONTROL SIGNAL

BACKGROUND OF THE INVENTION

A wireless local area network (WLAN) may include a basic service set (BSS). The BSS may include an access point (AP) and one or more stations (STA). IEEE 802.11 standard—1999 defines two scanning procedures, namely, an active scanning procedure and a passive scanning procedure. According to the active scanning procedure a station may send a probe request to the AP and may wait for a probe response from the AP. According to the passive scanning procedure, the station may periodically scan the channel, during a predetermined passive scanning time interval in order to detect one or more beacons. In order to detect the beacon the predetermined time interval may be longer than a beacon interval. For example, the beacon interval may be the time from transmission of one beacon to the time of transmission of a second beacon (e.g. 100 milliseconds), in which case the predetermined passive scanning time interval may be 120 milliseconds (msec).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

Figure 1:
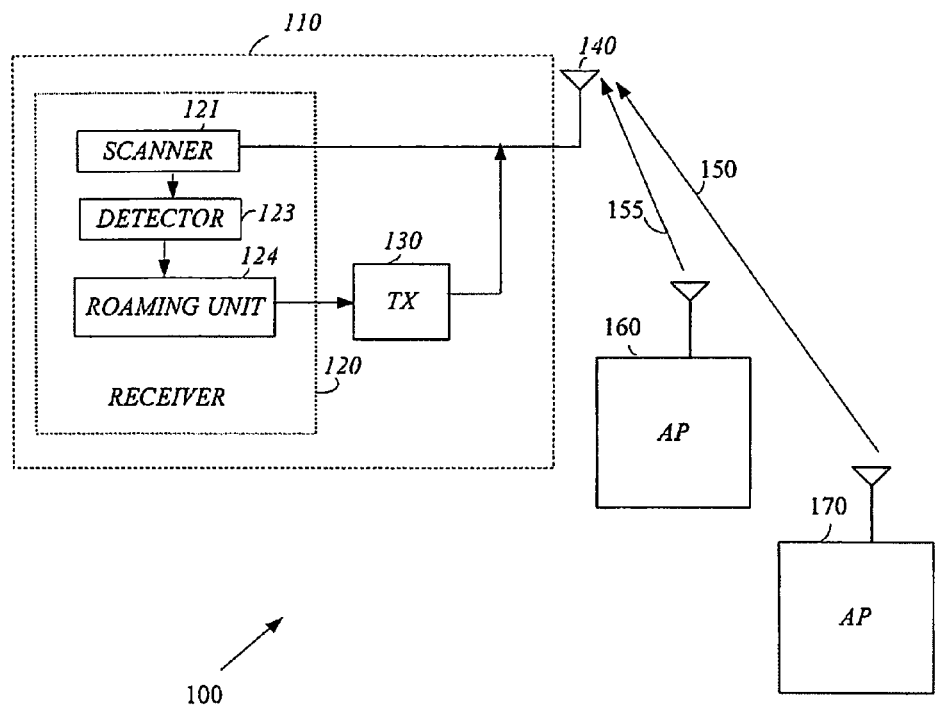
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a wireless communication system 100, for example, a WLAN, according to embodiments of the invention, is shown. Although the scope of the present invention is not limited in this respect, the exemplary WLAN 100 may be defined, e.g., by IEEE 802.11-1999 standard, as a basic service set (BSS). For example, the BSS may include at least one communication station, for example, a station 110 and access points (AP) 160 and 170, if desired. According to this embodiment of the invention, station 110 may include a receiver 120 a transmitter (TX) 130 and at least one antenna 140. Receiver 120 may include a control signal scanner 121, a detector 123 and a roaming unit 124.

Although the scope of the present invention is not limited in this respect, antenna 140 may be an omni-directional antenna, a monopole antenna, a dipole antenna, an end fed antenna, a circularly polarized antenna, a micro-strip antenna, a diversity antenna and the like.

Although the scope of the present invention is not limited in this respect, control signal scanner 121 may scan for one or more control signals for example, control signals 150 and 155. According to one embodiment of the invention, control signals 150, 155 may include beacons transmitted by AP 170 and AP 160, respectively. According to this exemplary embodiment, station 110 may perform passive scanning during reception of real time data packets by receiver 120. For example, the real time data packets may include voice packets, data from real time measuring devices, e.g., sensors, video or the like. For example, control signal scanner 121 may scan for one or more control signals during transmission of real time data packets. Control signal scanner may partition a control signal scanning period into two or more portions, wherein an interval between one portion of a scanning period to another portion of the scanning period may be substantially equal to an interval between two control signal transmissions; for example, according some embodiments of the invention, the interval between two control signals may be a beacon interval, if desired.

In some other embodiments of the invention, the portions may have different lengths and the interval between one portion to the other portion may vary according to a modulo of the control signal scanning interval, if desired.

Although the scope of the present invention is not limited in this respect, during the passive scanning detector 123 may detect control signal 150 and control signal 155, and based on an indication, for example a signal strength provided by at least one of the control signals, roaming unit 124 may roam communications of station 110 with AP 160 to communication with AP 170 based on an indication provided by a detected control signal (e.g. control signal 150 and 155). For example, roaming unit 124 may measure a signal strength of control signals 150 and 155 and may decided to roam station 110 from AP 160 to AP 170 based on the signal strength, If desired. It should be understood by those skilled in the art that roaming unit 124 may use other indications to be the base of the roaming decision and the scope of the invention is in no way limited in this respect.

Figure 2:
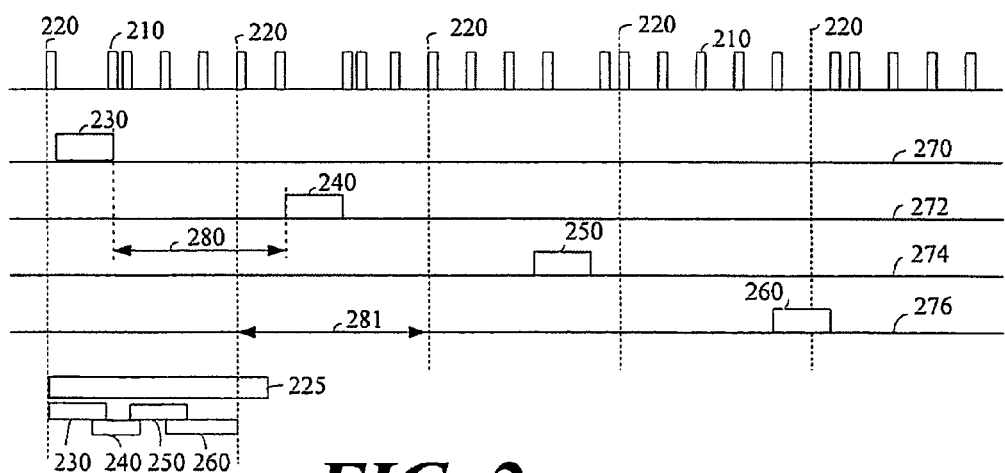
FIG. 2 is an illustration of a timing diagram helpful in demonstrating some exemplary embodiments of the present invention.

Turning to FIG. 2, an Illustration of a timing diagram helpful in demonstrating passive scanning according to exemplary embodiments of the invention is shown. Although the scope of the present invention is not limited in this respect, according to this timing diagram, blocks 210 may represent voice data packet, vertical dotted lines may represent control signals (e.g. beacons), blocks 230, 240, 250 and 260 may represent portions of a control signal scanning interval 225, and horizontal lines 270, 272, 274 and 276 may represent time of scanning, if desired.

Although the scope of the present invention is not limited in this respect, according to embodiments of the invention, the control signal scanning interval 225 may be partitioned into two or more portions (e.g., blocks 230, 240, 250 and 260) wherein an interval (e.g. line 280) between one portion of the scanning period (e.g., block 230) and a succeeding portion of the scanning period (e.g., block 240) may be substantially equal to a control signal transmission interval 281. According to embodiments of the invention, the time of control signal scanning interval 225 may be longer than the time of control signal transmission interval 281. For example, the time of control signal scanning interval 225 may be 120 milliseconds (msec) and the time of control signal transmission interval 281 may be 100 msec. In some embodiment of the invention, the size of a portion may vary from portion to portion. In addition, a time of one portion (e.g. portion 240) may overlap with a time of a succeeding portion (e.g. portion 250) according to a modulo of control signal scanning interval 225. For example, control signal scanning interval 225 may be equal to the sum of portions 230, 240, 250 and 260.

Although the scope of the present invention is not limited in this respect, interval 280 may be a multiplication of control signal transmission interval 281 by a selected integer variable "N", for example 1, 2, 3, 4. For example, the length of the control signal scanning period may be divided into N overlapping time intervals lengths smaller than a maximum delay period for example, the time of an interval may be 35 msec, if desired. According this example, control signal 220 may be detected during portion 260 of the scanning period.

Although the scope of the present invention is not limited in this respect, a channel of a wireless communication system may be scanned randomly to detect the control signal, e.g., during arbitrarily selected time periods. In some other embodiments of the invention, the channel maybe scanned periodically and in some other embodiments of the present invention the channel may be scanned in discord with a transmissions schedule of the control signal, if desired. In another embodiment of the invention, the portions of the control signal scanning interval 225 may operate out of order and may begin scanning at random times, if desired While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
    passively scanning on one channel during a sequence of a plurality of time periods for detecting a control signal, wherein the duration of each of the plurality of time periods is less than a control signal scanning interval and the combined duration of the plurality of time periods is greater than the control signal scanning interval and wherein the start times for initiating the scanning during successive time periods of the plurality of time periods are spaced by an interval greater than the control signal scanning interval.

2. The method of claim 1, comprising:
    determining an interval from the end time of scanning to the start time of scanning for successive time periods of the plurality of time periods by multiplying the control signal transmission interval by a selected integer value.

3. The method of claim 1, comprising:
    randomly scanning a channel to detect the control signal for a random time.

4. The method of claim 1, comprising:
    scanning a channel according to a schedule of transmissions of the control signal.

5. The method of claim 1, comprising:
    scanning for one or more control signals during transaction of synchronous data packets.

6. The method of claim 1, comprising:
    scanning for one or more control signals during transaction of voice data packets.

7. The method of claim 1, comprising:
    scanning for one or more control signals;
    detecting one or more control signals; and
    roaming from one station to another station based on an indication provided by a detected signal.

8. An apparatus comprising:
    a control signal scanner to scan for one or more control signals by passively scanning on one channel during a sequence of a plurality of time periods for detecting a control signal, wherein the duration of each of the plurality of time periods is less than a control signal scanning interval and the combined duration of the plurality of time periods is greater than the control signal scanning interval and wherein the start times for initiating the scanning during successive time periods of the plurality of time periods are spaced by an interval greater than the control signal scanning interval.

9. The apparatus of claim 8, wherein an interval from the end time of scanning to the start time of scanning for successive time periods of the plurality of time periods is a multiplication of the control signal transmission interval and a selected integer variable.

10. The apparatus of claim 8, wherein the control signal scanner is able to scan for one or more control signals during transactions of real time data packets.

11. The apparatus of claim 8, wherein the control signal scanner is able to scan for one or more control signals during transactions of voice data packets.

12. The apparatus of claim 8, comprising:
    a detector to detect one or more control signals; and
    a roaming unit to roam communications of the apparatus with one station to communication with another station based on an indication provided by a detected control signal.

13. The apparatus of claim 8, wherein the control signal scanner is able to scan a channel randomly to detect the control signal for a random time period.

14. The apparatus of claim 8, wherein the control signal scanner is able to scan a channel according to a transmissions schedule of the control signal.

15. A wireless communication device comprising:
 a one or more dipole antennas to receive one or more control signals; and
 a control signal scanner to scan for the one or more control signals by passively scanning on one channel during a sequence of a plurality of time periods for detecting a control signal, wherein the duration of each of the plurality of time periods is less than a control signal scanning interval and the combined duration of the plurality of time periods is greater than the control signal scanning interval and wherein the start times for initiating the scanning during successive time periods of the plurality of time periods are spaced by an interval greater than the control signal scanning interval.

16. The wireless communication device of claim 15, wherein an interval from the end time of scanning to the start time of scanning for successive time periods of the plurality of time periods is a multiplication of the control signal transmission interval and a selected integer variable.

17. The wireless communication device of claim 15, wherein the control signal scanner is able to scan for one or more control signals during transactions of real time data packets.

18. The wireless communication device of claim 15, wherein the control signal scanner is able to scan for one or more control signals during transactions of voice data packets.

19. The wireless communication device of claim 15, comprising:
 a detector to detect one or more control signals; and
 a roaming unit to roam communications of the apparatus with one station to communication with another station based on an indication provided by a detected control signal.

20. The wireless communication device of claim 15, wherein the control signal scanner is able to scan randomly a channel for detecting the control signal for a random time period.

21. The wireless communication device of claim 15, wherein the control signal scanner is able to scan a channel according to a transmissions schedule of the control signal.

22. A wireless communication system comprising:
 a mobile communication unit having a control signal scanner to scan for the one or more control signals by passively scanning on one channel during a sequence of a plurality of time periods for detecting a control signal, wherein the duration of each of the plurality of time periods is less than a control signal scanning interval and the combined duration of the plurality of time periods is greater than the control signal scanning interval and wherein the start times for initiating the scanning during successive time periods of the plurality of time periods are spaced by an interval greater than the control signal scanning interval.

23. The wireless communication system of claim 22, wherein an interval from the end time of scanning to the start time of scanning for successive time periods of the plurality of time periods is a multiplication of the control signal transmission interval and a selected integer variable.

24. The wireless communication system of claim 22, wherein the control signal scanner is able to scan for one or more control signals during transactions of real time data packets.

25. The wireless communication system of claim 22, wherein the control signal scanner is able to scan for one or more control signals during transactions of voice data packets.

26. The wireless communication system of claim 22, comprising:
 a detector to detect one or more control signals; and
 a roaming unit to roam communications of the apparatus with one station to another station based on an indication provided by a detected control signal.

27. The wireless communication system of claim 22, wherein the control signal scanner is able to scan randomly a channel for detecting the control signal for a random time period.

28. The wireless communication system of claim 22, wherein the control signal scanner is able to scan a channel according to a transmissions schedule of the control signal.

29. A computer readable storing a computer program, having stored thereon instructions, that when executed, result in:
 passively scanning on one channel during a sequence of a plurality of time periods for detecting a control signal, wherein the duration of each of the plurality of time periods is less than a control signal scanning interval and the combined duration of the plurality of time periods is greater than the control signal scanning interval and wherein the start times for initiating the scanning during successive time periods of the plurality of time periods are spaced by an interval greater than the control signal scanning interval.

30. The computer readable medium of claim 29, wherein the instructions when executed result in:
 determining an interval from the end time of scanning to the start time of scanning for successive time periods of the plurality of time periods by multiplying the control signal transmission interval by a selected integer value.

31. The computer readable medium of claim 29, wherein the instructions when executed result in:
 randomly scanning a channel for detecting the control signal for a random time.

32. The computer readable medium of claim 29, wherein the instructions when executed result in:
 scanning a channel according to a schedule of transmissions of the control signal.

33. The computer readable medium of claim 29, wherein the instructions when executed result in:
 scanning for one or more control signals during transaction of synchronous data packets.

34. The computer readable medium of claim 29, wherein the instructions when executed result in:
 scanning for one or more control signals during transaction of voice data packets.

35. The computer readable medium of claim 29, wherein the instructions when executed result in:
 scanning for one or more control signals;
 detecting one or more control signals; and
 roaming from one station to another station based on an indication provided by a detected signal.

* * * * *

UNITED STATES PATENT AND TRADEMARK OFFICE
CERTIFICATE OF CORRECTION

PATENT NO. : 7,602,755 B2  Page 1 of 1
APPLICATION NO. : 10/989409
DATED : October 13, 2009
INVENTOR(S) : Ginzburg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this

Fifth Day of October, 2010

David J. Kappos
*Director of the United States Patent and Trademark Office*